US011002184B2

(12) United States Patent
Hashizume et al.

(10) Patent No.: US 11,002,184 B2
(45) Date of Patent: May 11, 2021

(54) POWER GENERATOR MANAGEMENT SYSTEM

(71) Applicant: HONDA MOTOR CO., LTD., Tokyo (JP)

(72) Inventors: Takashi Hashizume, Wako (JP); Manabu Dobashi, Wako (JP); Tetsuya Matsuhisa, Wako (JP); Ryota Hisada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 16/750,232

(22) Filed: Jan. 23, 2020

(65) Prior Publication Data

US 2020/0271052 A1 Aug. 27, 2020

(30) Foreign Application Priority Data

Feb. 26, 2019 (JP) .............................. JP2019-032981

(51) Int. Cl.
*F02B 63/04* (2006.01)
*B60K 5/12* (2006.01)

(52) U.S. Cl.
CPC .......... *F02B 63/048* (2013.01); *B60K 5/1216* (2013.01)

(58) Field of Classification Search
CPC ........ F02B 63/04; F02B 63/048; F02B 65/00; B60K 5/1216; F02D 29/06; H02P 9/00; H02P 9/02
See application file for complete search history.

(56) References Cited

U.S. PATENT DOCUMENTS

| 6,441,505 | B1 * | 8/2002 | Poletti | F02B 63/04 |
| | | | | 123/350 |
| 6,542,076 | B1 * | 4/2003 | Joao | B60R 25/33 |
| | | | | 340/539.14 |
| 9,310,279 | B2 * | 4/2016 | Crombie | B60H 1/00264 |
| 10,260,456 | B2 | 4/2019 | Hiranuma et al. | |
| 2002/0197988 | A1 * | 12/2002 | Hellaker | G08G 1/20 |
| | | | | 455/423 |

(Continued)

FOREIGN PATENT DOCUMENTS

| JP | 2017-166400 A | 9/2017 | |
| WO | WO-02091562 A1 * | 11/2002 | ............... H02P 9/04 |

*Primary Examiner* — Hung Q Nguyen
(74) *Attorney, Agent, or Firm* — Thomas | Horstemeyer, LLP (57) ABSTRACT

A power generator management system comprises a plurality of power generators, and an information processing apparatus configured to process information acquired from the plurality of power generators. Each power generator comprises: a detection unit configured to detect a remaining fuel amount in a fuel tank of the power generator; a position acquisition unit configured to acquire position information of the power generator; a state acquisition unit configured to acquire information representing an operating state of the power generator; and a communication unit configured to transmit the remaining fuel amount, the position information, and information representing the operating state to the information processing apparatus, and the information processing apparatus comprises a processing unit configured to acquire a margin level of power supply in each of the plurality of power generators and provide a result of the acquisition.

18 Claims, 5 Drawing Sheets

(56) References Cited

U.S. PATENT DOCUMENTS

| | | | |
|---|---|---|---|
| 2005/0143947 A1* | 6/2005 | James | H04L 43/50 |
| | | | 702/122 |
| 2006/0090552 A1* | 5/2006 | Ziegler | G01F 9/008 |
| | | | 73/114.54 |
| 2013/0104851 A1* | 5/2013 | Falkowski | F02D 41/32 |
| | | | 123/446 |
| 2013/0168969 A1* | 7/2013 | Markoski | F01N 13/08 |
| | | | 290/1 A |
| 2013/0338901 A1* | 12/2013 | Kumar | F02D 41/021 |
| | | | 701/102 |
| 2014/0152006 A1* | 6/2014 | Sterregaard | F02D 29/06 |
| | | | 290/7 |
| 2014/0157809 A1* | 6/2014 | Crombie | B60H 1/00378 |
| | | | 62/129 |
| 2014/0217746 A1* | 8/2014 | Moser | F02D 29/06 |
| | | | 290/40 B |
| 2015/0115616 A1* | 4/2015 | Gomez | F02D 41/021 |
| | | | 290/40 B |
| 2017/0268458 A1 | 9/2017 | Hiranuma et al. | |
| 2018/0080392 A1* | 3/2018 | Janscha | F02B 69/04 |

* cited by examiner

POWER GENERATOR MANAGEMENT SYSTEM

CROSS-REFERENCE TO RELATED APPLICATION

This application claims priority to and the benefit of Japanese Patent Application No. 2019-032981 filed on Feb. 26, 2019, the entire disclosure of which is incorporated herein by reference.

BACKGROUND OF THE INVENTION

Field of the Invention

The present invention relates to a power generator management system.

Description of the Related Art

Japanese Patent Laid-Open No. 2017-166400 discloses an engine-driven power generator. For example, in a disaster occurrence, such a power generator can be carried from a storehouse or the like in a municipality to a disaster base such as a shelter and supply power for evacuees.

However, if the power generators are used on a standalone basis without being connected to a network, a server cannot acquire the position information of each power generator or information concerning a remaining fuel amount or operating state. For example, since the operating state of each power generator is unknown, it may be impossible to provide a power generator to a base (shelter) where power is needed, or a fuel shortage may locally occur due to concentration of evacuees to a specific shelter.

In addition, since the operating states of power generators arranged in each shelter or information concerning the margin level of power supply of the power generators cannot be provided to a person needing refuge, the person needing refuge may be unable to know which shelter to go. In addition, if the person needing refuge goes to a shelter where the margin level of power supply is low, it may be impossible to receive power supply.

The present invention has been made to solve at least one of the above-described problems, and provides a power generator management technique capable of providing information concerning power supply of a plurality of power generators based on information transmitted from the plurality of power generators.

SUMMARY OF THE INVENTION

According to one aspect of the present invention, there is provided a power generator management system comprising a plurality of power generators, and an information processing apparatus configured to process information acquired from the plurality of power generators, wherein each of the plurality of power generators comprises: a detection unit configured to detect a remaining fuel amount in a fuel tank of the power generator; a position acquisition unit configured to acquire position information of the power generator; a state acquisition unit configured to acquire information representing an operating state of the power generator; and a communication unit configured to transmit the remaining fuel amount, the position information, and information representing the operating state to the information processing apparatus via a network, and the information processing apparatus comprises an information processing unit configured to acquire a margin level of power supply in each of the plurality of power generators based on the information transmitted from the plurality of power generators and provide a result of the acquisition.

According to the present invention, it is possible to acquire the margin level of power supply of a plurality of power generators based on information transmitted from the plurality of power generators and provide a result of acquisition as information concerning the power supply.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

(Outline of Power Generator Management System)

Figure 1:
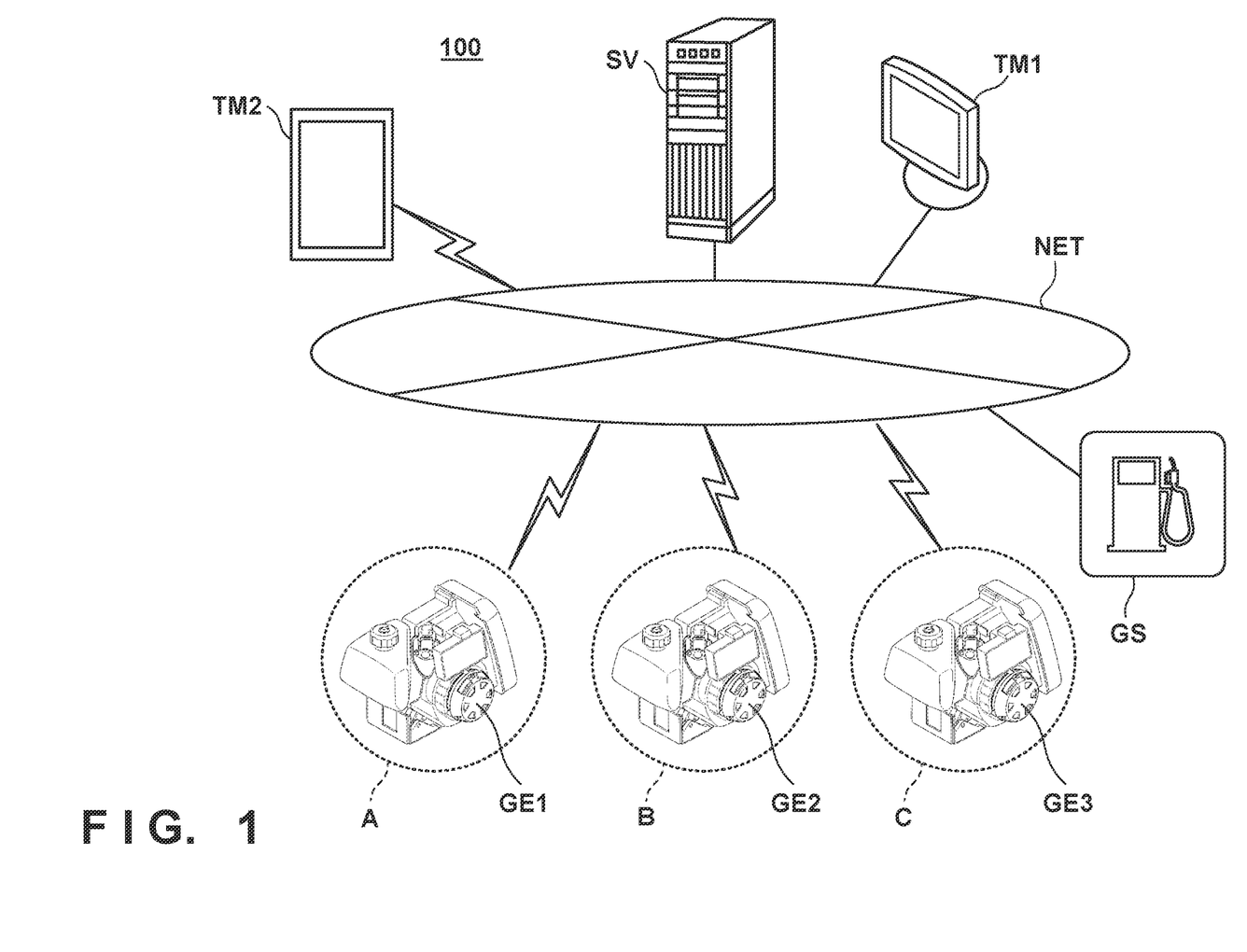
FIG. 1 is a schematic view showing the outline of a power generator management system according to an embodiment.

FIG. 1 is a schematic view showing the outline of a power generator management system according to an embodiment. A power generator management system 100 includes a plurality of power generators GE1, GE2, and GE3, and an information processing apparatus SV configured to process information acquired from the plurality of power generators. The information processing apparatus SV is configured to be communicable with the plurality of power generators GE1, GE2, and GE3 via a network NET. Referring to FIG. 1, the power generator GE1 is arranged in a base A (shelter A), the power generator GE2 is arranged in a base B (shelter B), and the power generator GE3 is arranged in a base C (disaster supplies storehouse C).

In the example shown in FIG. 1, one power generator GE3 is arranged in the base C (disaster supplies storehouse C). However, the base C (disaster supplies storehouse C) can have a plurality of power generators in stock, and supply the power generators to bases short in power generators in accordance with an instruction from the information processing apparatus SV. A result processed by the information processing apparatus SV can be provided to portable information terminal devices TM1 and TM2 such as smartphones via the network NET.

(Arrangement of Power Generator)

Figure 2:
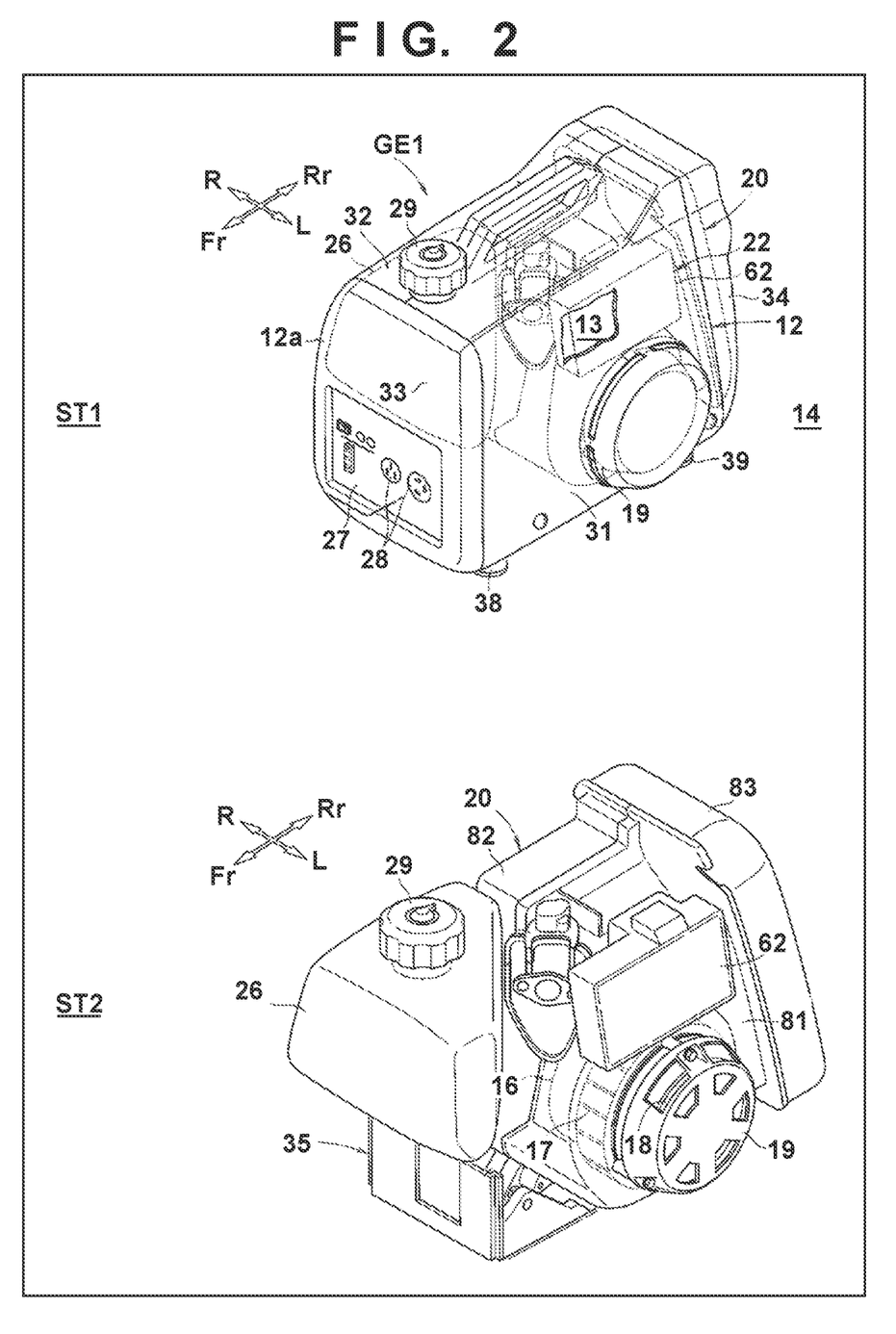
FIG. 2 is a view showing the schematic structure of a power generator according to the embodiment.

FIG. 2 is a view showing the schematic structure of the power generator according to the embodiment. FIG. 2 exemplarily shows the structure of the power generator GE1 in the plurality of power generators. The remaining power generators GE2 and GE3 also have a similar structure.

As for "front (Fr)", "rear (Rr)", "left (L)", and "right (R)" shown in FIG. 2, the side of an operation panel 27 of the power generator GE1 is defined as front (Fr). As shown in ST1 and ST2 of FIG. 2, the power generator GE1 includes an exterior case 12 that forms the outer frame of the power generator GE1, an engine (not shown) stored in an interior 13 of the exterior case 12, a power generation unit 16 provided on the left side of the engine, a cooling fan 17 provided on the left side of the power generation unit 16, a recoil starter 18 provided on the left side of the cooling fan 17, and a cover unit 20 that covers the engine. The recoil starter 18 is covered with a recoil cover 19.

The cover unit 20 includes a fan cover 81 provided on the left side of the engine, a shroud 82 provided on the right side of the engine, and a muffler cover 83 provided at the rear ends of the fan cover 81 and the shroud 82. An air cleaner 62 is arranged outside the fan cover 81 included in the cover unit 20.

In addition, the power generator GE1 includes an intake system component 22 communicating with the engine, a fuel tank 26 arranged on the front side of the engine, and the operation panel 27 provided on a front wall 12a of the exterior case 12. According to the power generator GE1, when the recoil starter 18 is manually rotated, the engine is driven, and the rotor of the power generation unit 16 rotates. When the rotor of the power generation unit 16 rotates, an electromotive force is generated in the rotor and the stator, and the power generation unit 16 performs power generation. DC power generated by the power generation unit 16 is converted into AC power by an inverter, and fed from a connector 28 of the operation panel 27 to the outside.

In addition, the cooling fan 17 is connected to the rotor of the power generation unit 16. Hence, when the rotor of the power generation unit 16 rotates, the cooling fan 17 rotates. When the cooling fan 17 rotates, outside air is sucked from an outside 14 of the exterior case 12 into the interior 13, and the sucked outside air is sent as cooling air to the intake system component 22 and the engine.

The exterior case 12 includes a left case 31 that forms the left half of the exterior case 12, a right case 32 that forms the right half of the exterior case 12, a front case 33 attached to the front ends of the left case 31 and the right case 32, a rear case 34 attached to the rear ends of the left case 31 and the right case 32, and an undercover 35 that supports the cases 31 to 34.

The engine, the cover unit 20, and the fuel tank 26 are stored in the interior 13 of the exterior case 12. In this state, a tank cap 29 of the fuel tank 26 is projected (exposed) to the upper side of the exterior case 12. The front wall 12a of the exterior case 12 is formed by the front wall of the front case 33. The operation panel 27 is provided on the front wall 12a of the front case 33.

Front rubber support portions 38 (only the front rubber support portion 38 on the left side is shown) are attached to the left and right sides of the front end of the undercover 35. In addition, rear rubber support portions 39 (only the rear rubber support portion 39 on the left side is shown) are attached to the left and right sides of the rear end of the undercover 35. The power generator GE1 is supported on a floor surface or the like by the front rubber support portions 38 on the left and right sides and the rear rubber support portions 39 on the left and right sides.

(Functional Arrangement of Power Generator GE1)

Figure 3:
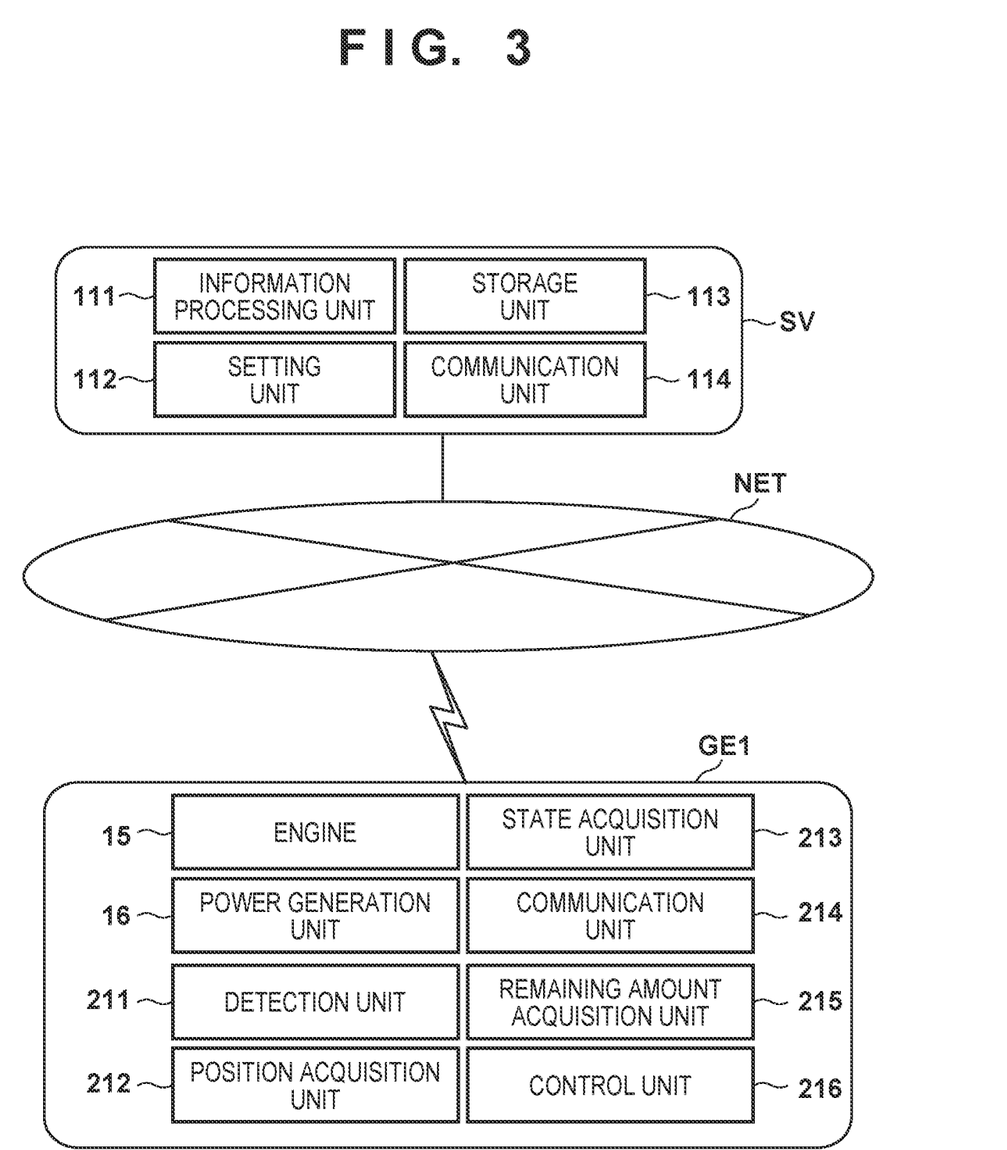
FIG. 3 is a view for explaining the functional arrangements of the power generator and an information processing apparatus.

FIG. 3 is a view for explaining the functional arrangements of the power generator and the information processing apparatus. FIG. 3 exemplarily shows the functional arrangement of the power generator GE1 in the plurality of power generators. The remaining power generators GE2 and GE3 also have a similar functional arrangement. An example of the arrangement of one of the plurality of power generators is shown here. The remaining power generators also have a similar arrangement.

As for an engine 15 (internal combustion engine) of the power generator GE1, as described with reference to FIG. 2, when the recoil starter 18 is manually rotated, the engine 15 is driven, and the rotor of the power generation unit 16 rotates. When the rotor of the power generation unit 16 rotates, an electromotive force is generated in the rotor and the stator, and DC power generated by the power generation unit 16 is converted into AC power by the inverter and becomes feedable from the connector 28 of the operation panel 27 to the outside.

A detection unit 211 detects the remaining fuel amount in the fuel tank 26 of the power generator GE1. In addition, a position acquisition unit 212 acquires the position information of the power generator GE1. For example, the position acquisition unit 212 includes a position sensor such as a GPS (Global Positioning System) sensor configured to acquire information representing the position of a power generator. A state acquisition unit 213 acquires information representing the operating state of the power generator GE1. In a state in which the power generator GE1 has started, the state acquisition unit 213 acquires an ON signal as the information representing the operating state. In a state in which the power generator GE1 is stopped, the state acquisition unit 213 acquires an OFF signal as the information representing the operating state.

A communication unit 214 can be connected to the network NET via a communication interface, and transmits the remaining fuel amount in the fuel tank 26, the position information of the power generator GE1, and the information representing the operating state (for example, the ON signal, the OFF signal, information representing the power generation capability of a power generator GE or a power margin level) to the information processing apparatus SV via the network NET. A remaining amount acquisition unit 215 acquires the remaining fuel amount in a reserve tank provided outside the power generator. For example, when an operator inputs the remaining fuel amount in the reserve tank from an input unit (user interface) (not shown), the remaining amount acquisition unit 215 acquires the input result as the remaining fuel amount in the reserve tank. When the remaining amount acquisition unit 215 acquires the remaining fuel amount in the reserve tank, the communication unit 214 transmits, to the information processing apparatus SV, information representing the remaining fuel amount in the fuel tank 26 and information representing the remaining fuel amount in the reserve tank.

A control unit 216 controls the power generator GE1. For example, the control unit 216 may be a semiconductor device such as an ASIC (Application Specific Integrated Circuit), or may be a CPU (Central Processing Unit) and a memory. The function of the control unit 216 can be implemented by either hardware or software.

The control unit 216 can calculate a power margin level representing the degree of margin of power supply based on the information representing the power generation capability of the power generator GE1 and the information representing the remaining fuel amount. Here, the information representing the power generation capability of the power generator GE1 indicates power that the power generator GE1 can generate using a predetermined amount of fuel serving as a reference. That is, it is power that can be generated per unit fuel. In addition, the power margin level indicates power that the power generator GE1 can generate according to the information representing the remaining fuel amount (the remaining fuel amount in the fuel tank 26 and the remaining fuel amount in the reserve tank). For example, the control unit 216 can acquire, as the power margin level, a result (P×F) obtained by multiplying information P (power that can be generated per unit fuel) representing the power generation capability of the power generator GE1 by a remaining fuel amount F.

When the control unit 216 calculates the power margin level, the communication unit 214 transmits the power margin level (P×F) included in the information representing the operating state to the information processing apparatus SV.

Note that the power margin level need not always be acquired by the control unit 216 of the power generator GE1, and may be calculated on the side of the information processing apparatus SV that functions as the server of the power generator management system 100. In this case, the communication unit 214 transmits the information P (power that can be generated per unit fuel) representing the power generation capability of the power generator GE1, which is included in the information representing the operating state of the power generator GE1, to the information processing apparatus SV.

The control unit 216 can also specify the base (for example, the base A in FIG. 1) where the power generator GE1 (self-machine) is arranged based on the position information acquired by the position acquisition unit 212, and collect, via the network NET, fuel information from a vehicle (peripheral vehicle) located within a predetermined range with respect to the base as the center.

Figure 4:
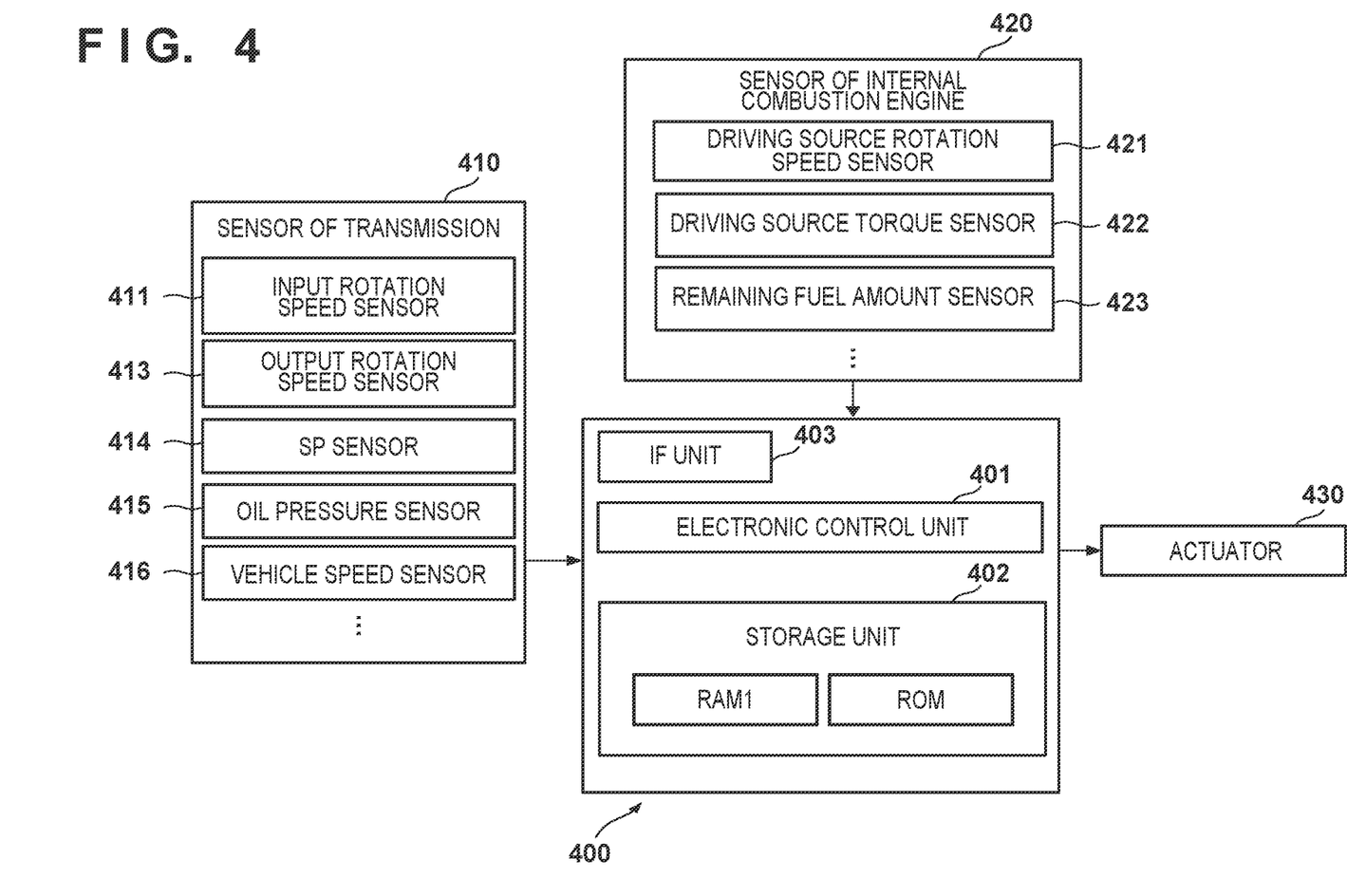
FIG. 4 is a block diagram of a control apparatus configured to control a vehicle (automated driving vehicle) located on the periphery of the power generator.

FIG. 4 is a block diagram of a control apparatus 400 configured to control a vehicle (automated driving vehicle) located on the periphery of the power generator. The control apparatus 400 of the vehicle includes an electronic control unit 401 (ECU) functioning as a processing unit such as a CPU, a storage unit 402 such as a RAM or a ROM, and an IF unit 403 functioning as a communication unit configured to communicate with an external device. The electronic control unit 401 (ECU) executes a program stored in the storage unit 402, and controls various kinds of actuators 430 based on the detection results of various kinds of sensors. The control apparatus 400 can receive information of various kinds of sensors from a sensor 410 of an automatic transmission that drives the vehicle, and a sensor 420 of the internal combustion engine. The control apparatus 400 can also transmit the received information of the various kinds of sensors from the IF unit 403 to the power generator GE1 as an information request source. If the information request source is the information processing apparatus SV, the IF unit 403 can transmit the information of the various kinds of sensors to the information processing apparatus SV.

If the information processing apparatus SV functions as the request source of the information of the various kinds of sensors, an information processing unit 111 of the information processing apparatus SV can specify the base where each power generator is arranged based on the position information of the power generator, and collect, via the network NET, fuel information from a vehicle located within a predetermined range with respect to the base as the center. In addition, the information processing unit 111 can also output, via the network NET, a control signal to a vehicle such that it moves to the base.

The sensor 420 of the internal combustion engine includes various sensors, and includes, for example, a driving source rotation speed sensor 421 configured to detect the rotation speed of the internal combustion engine (driving source), a driving source torque sensor 422 configured to detect the torque of the driving source, and a remaining fuel amount sensor 423 configured to detect the remaining fuel amount in the fuel tank.

In addition, the sensor 410 of the automatic transmission includes the following sensors. For example, an input rotation speed sensor 411 is a sensor configured to detect a rotation speed input from the internal combustion engine to a torque converter, that is, the rotation speed of the output shaft of the torque converter. An output rotation speed sensor 413 is a sensor configured to detect the rotation speed of the output shaft of the torque converter.

An SP sensor (shift position sensor) 414 is a sensor configured to detect a shift position selected by a driver. Four types of shift positions, that is, P range (parking range), D range (forward range), N range (neutral range), and R range (reverse range) are included. An oil pressure sensor 415 includes a sensor configured to detect the oil pressure of each hydraulic oil used to drive an engaging mechanism in the automatic transmission. A vehicle speed sensor 416 detects the traveling speed of the vehicle on which the automatic transmission is mounted. The actuator 430 includes various kinds of actuators provided in the automatic transmission. For example, an electromagnetic actuator such as an electromagnetic solenoid configured to switch the operation state of an engaging mechanism in the automatic transmission is included.

(Functional Arrangement of Information Processing Apparatus SV)

The functional arrangement of the information processing apparatus SV will be described next. The information processing apparatus SV includes, as the functional arrangement, the information processing unit 111, a setting unit 112, a storage unit 113, and a communication unit 114. The information processing unit 111 and the setting unit 112 execute various kinds of programs stored in the storage unit 113. The communication unit 114 can be connected to the network NET via a communication interface, and can acquire information from the plurality of power generators (GE1, GE2, and GE3). In addition, the communication unit 114 can provide the processing results of the information processing unit 111 and the setting unit 112 to the information terminal devices TM1 and TM2 via the network NET.

Figure 5:
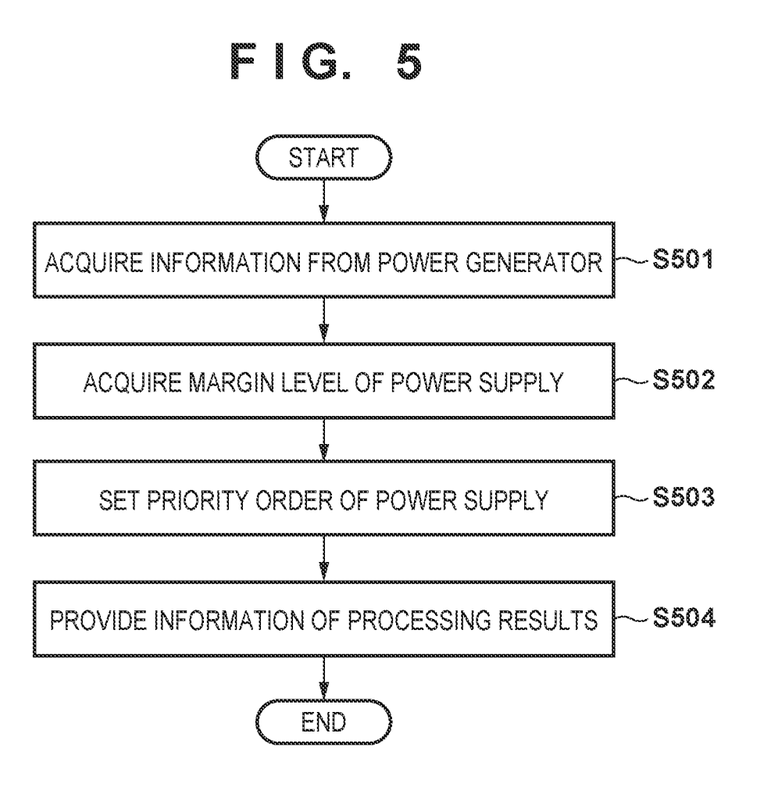
FIG. 5 is a flowchart for explaining the procedure of processing of the information processing apparatus.

FIG. 5 is a flowchart for explaining the procedure of processing of the information processing apparatus SV. In step S501, the information processing unit 111 of the information processing apparatus SV acquires information from the plurality of power generators via the network NET. In step S502, the information processing unit 111 acquires the margin level of power supply based on the information acquired from the plurality of power generators.

In step S503, the setting unit 112 sets the priority order of power supply based on the information acquired from the plurality of power generators, the remaining fuel amount, and the power margin level. In step S504, under the control of the information processing unit 111, the communication unit 114 provides the processing results of the information processing unit 111 and the setting unit 112 concerning the margin level of power supply, the priority order of power supply, and the like via the network NET.

(Acquisition of Margin Level of Power Supply)

The information processing unit 111 acquires, from each power generator, the remaining fuel amount (the remaining fuel amounts in the fuel tank 26 and the reserve tank), the information of a position where the power generator is arranged, and information representing the operating state.

The information processing unit 111 acquires the margin levels of power supply in the plurality of power generators based on the information transmitted from the plurality of power generators (GE1, GE2, and GE3), and provides the result of acquisition. The information representing the operating state includes the information P (power that can be generated per unit fuel) representing the power generation capability of the power generator GE1. The information processing unit 111 acquires a power margin level representing the degree of margin of power supply in each power generator based on the information representing the power generation capability of the power generator and the information representing the remaining fuel amount, which are transmitted from each of the plurality of power generators (GE1 and GE2). The information processing unit 111 acquires, as the power margin level, the result (P×F) obtained by multiplying the information P representing the power generation capability of the power generator GE1 by the remaining fuel amount F.

Here, if the information representing the operating state transmitted from the power generator includes the power margin level acquired by the control unit 216 of the power generator GE1, the information processing unit 111 may provide the power margin level acquired by the control unit 216 as the acquisition result of the margin level of power supply, instead of internally executing an operation for obtaining the power margin level.

Note that the information processing unit 111 can specify the base where each power generator is arranged based on the position information of the power generator, and collect, via the network NET, fuel information from a vehicle located within a predetermined range with respect to the base as the center. In addition, the information processing unit 111 can also output a control signal to a vehicle such that it moves to a base located near the vehicle to allow the power generator to use the fuel in the vehicle.

(Setting of Priority Order of Power Supply)

Setting of a Priority Order Based on the Remaining Fuel Amount (The Margin Level of Power Supply)

The setting unit 112 of the information processing apparatus SV sets a priority order to supply fuel to each of the plurality of power generators. The setting unit 112 sets the priority order based on the position information and the information representing the remaining fuel amount (or the margin level of power supply). For example, the setting unit 112 specifies a power generator in ascending order of remaining fuel amount (in ascending order of margin level of power supply) based on the remaining fuel amounts (or the margin levels of power supply) acquired from the plurality of power generators, and sets a higher priority order in accordance with the specified order. For example, since the power generator of the smallest remaining fuel amount (the power generator of the lowest margin level of power supply) is a power generator of high urgency whose remaining fuel amount is going to be zero, the setting unit 112 sets the highest priority order for the power generator.

Setting of a Priority Order Based on the Distance Between a Power Generator and a Facility Capable of Providing Fuel When setting a priority order based on the remaining fuel amount (or the margin level of power supply), based on comparison between the position of a facility (gas station: GS) capable of providing fuel and the position information of the power generator GE1 (the position information of the base (shelter) where the power generator is arranged), the setting unit 112 can set the priority order in accordance with the distance from each power generator to the facility.

Figure 6:
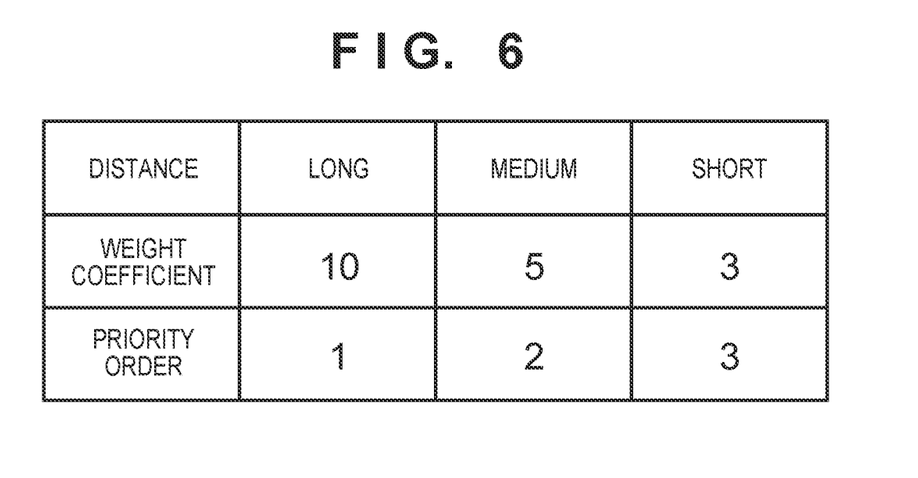
FIG. 6 is a view showing an example of setting of priority orders.

For example, it is possible to set a low priority order for a power generator close to the facility GS capable of providing fuel and set a high priority order for a power generator far apart from the facility GS capable of providing fuel. In addition, a weight according to a distance may be set, and a priority order based on the remaining fuel amount (margin level of power supply) may be multiplied by a weight coefficient to obtain a priority order. For example, as shown in FIG. 6, it is possible to set a weight coefficient in accordance with the distance between the position of the facility (gas station GS) capable of providing fuel and the position information of the power generator GE1, which is classified into long, medium, or short. For example, the priority order of fuel supply can be set by setting a weight coefficient "10" for a power generator farthest from the facility (gas station GS), a weight coefficient "5" for a power generator at a medium distance, and a weight coefficient "3" for a power generator closest to the facility (gas station GS). For example, it is possible to set a high priority order (priority order 1) for a power generator (for example, GE1 in FIG. 1) farthest from the facility (gas station GS), set a medium priority order (priority order 2) for a power generator (for example, GE2 in FIG. 1) at a medium distance, and set the lowest priority order (priority order 3) for a power generator (for example, GE3 in FIG. 1) closest to the facility (gas station GS).

Setting of a Priority Order Based on a Fuel Consumption Rate

The setting unit 112 acquires information representing the remaining fuel amount from each of the plurality of power generators (GE1, GE2, and GE3) at a predetermined timing, and calculates the fuel consumption rate in each power generator based on a time-rate change of the information representing the remaining fuel amount. The setting unit 112 sets a priority order of fuel supply based on the fuel consumption rate. For example, it is possible to set a high priority order for a power generator whose fuel consumption rate is higher than a predetermined threshold and set a low priority order for a power generator whose fuel consumption rate is equal to or lower than the predetermined threshold.

(Information Providing by Information Processing Unit)

Based on the information transmitted from the plurality of power generators (GE1, GE2, and GE3), the information processing unit 111 can provide information that combines the position information of a power generator in the operating state (a power generator that outputs the ON signal) and the power margin level to the external information terminal devices TM1 and TM2 via the network NET. Persons needing refuge who view the information terminal devices TM1 and TM2 can determine the power margin level of each base (shelter), for example, which base (shelter) can supply sufficient power or is short in power.

The information processing unit 111 provides information that combines information arranged in the descending order of power margin level and the information of a base where a power generator corresponding to the power margin level is arranged, and causes the display units of the information terminal devices TM1 and TM2 to display the information. The information processing unit 111 can provide the position information of the base of the highest power margin level in the plurality of bases (A and B) as shown in FIG. 1 and route information for guidance to the base and cause the display units of the information terminal devices TM1 and TM2 to display the information. The information processing unit 111 determines, based on the information (ON or OFF) representing the operating state, whether a power generator in a stop state exists among the plurality of power generators, and assigns the power generator in the stop state (for example, the power generator in C in FIG. 1) as a power generator in the base of the lowest power margin level in the plurality of bases. When the power generator in the stop state is assigned to the base of the lowest power margin level, leveling of the power margin levels of the bases (shelters) can be performed.

Other Embodiments

In addition, a program that implements each function of one or more power generators described in each embodiment is supplied to a system or an apparatus via a network or a storage medium, and one or more processors in the computer of the system or the apparatus can read out and execute the program. The present invention can also be implemented by this form.

<Summary of Embodiment>

Arrangement 1. A power generator management system according to the above embodiment is a power generator management system (for example, 100 in FIG. 1) comprising a plurality of power generators (for example, GE1, GE2, GE3 in FIG. 1), and an information processing apparatus (for example, SV in FIG. 1) configured to process information acquired from the plurality of power generators, wherein each of the plurality of power generators (GE1, GE2, GE3) comprises:

a detection unit (for example, 211 in FIG. 3) configured to detect a remaining fuel amount in a fuel tank of the power generator;

a position acquisition unit (for example, 212 in FIG. 3) configured to acquire position information of the power generator;

a state acquisition unit (for example, 213 in FIG. 3) configured to acquire information representing an operating state of the power generator; and a communication unit (for example, 214 in FIG. 3) configured to transmit the remaining fuel amount, the position information, and information representing the operating state to the information processing apparatus via a network, and the information processing apparatus (SV) comprises an information processing unit (for example, 111 in FIG. 3) configured to acquire a margin level of power supply in each of the plurality of power generators based on the information transmitted from the plurality of power generators (GE1, GE2, GE3) and provide a result of the acquisition.

According to the power generator management system of arrangement 1, it is possible to acquire the margin level of power supply in each of the plurality of power generators based on the information transmitted from each of the plurality of power generators and provide the result of acquisition as information concerning power supply.

Arrangement 2. In the power generator management system (100) according to the above embodiment, the power generator (GE1, GE2, GE3) further comprises a remaining amount acquisition unit (for example, 215 in FIG. 3) configured to acquire a remaining fuel amount in a reserve tank, and the communication unit (214) transmits information representing the remaining fuel amount in the fuel tank and information representing the remaining fuel amount in the reserve tank to the information processing apparatus (SV).

Arrangement 3. In the power generator management system according to the above embodiment, the remaining amount acquisition unit acquires the information representing the remaining fuel amount in the reserve tank based on information input from an input unit.

According to the power generator management system of arrangement 2 or 3, it is possible to acquire the information of the remaining fuel amount in the reserve tank and use the information in processing of acquiring the margin level of power supply.

Arrangement 4. In the power generator management system (100) according to the above embodiment, the information processing apparatus (SV) further comprises a setting unit (for example, 112 in FIG. 3) configured to set a priority order to supply fuel to each of the plurality of power generators (GE1, GE2, GE3), and the setting unit (112) sets the priority order based on the position information and information representing the remaining fuel amount.

According to the power generator management system of arrangement 4, it is possible to specify how much fuel is remaining at which base and set the priority order of fuel supply.

Arrangement 5. In the power generator management system (100) according to the above embodiment, the information processing unit (111) acquires installation position information of a facility capable of providing fuel to the power generator, and the setting unit (112) sets the priority order based on comparison between the installation position information and the position information of each of the plurality of power generators.

Arrangement 6. In the power generator management system according to the above embodiment, the setting unit (112) sets the priority order in accordance with a distance from each power generator to the facility.

According to the power generator management system of arrangement 5 or 6, it is possible to set the priority order based on comparison between the installation position information of the facility capable of providing the fuel to a power generator and the position information of each of the plurality of power generators.

Arrangement 7. In the power generator management system according to the above embodiment, the power generator further comprises a control unit (for example, 216 in FIG. 3) configured to control the power generator, wherein the control unit (216) calculates a power margin level representing a degree of margin of power supply based on information representing a power generation capability of the power generator and the information representing the remaining fuel amount, and the communication unit (214) transmits the power margin level to the information processing apparatus (SV).

According to the power generator management system of arrangement 7, it is possible to calculate the power margin level on the power generator side and transmit it to the information processing apparatus (SV). If the power margin level acquired by the control unit 216 of the power generator GE1 is included in the information representing the operating state, which is transmitted from the power generator, the information processing unit 111 of the information processing apparatus SV can provide the power margin level acquired by the control unit 216 as the acquisition result of the margin level of power supply, instead of internally executing an operation for obtaining the power margin level.

Arrangement 8. In the power generator management system (100) according to the above embodiment, the information processing unit (SV) acquires a power margin level representing a degree of margin of power supply in each power generator based on information representing a power generation capability of the power generator and the information representing the remaining fuel amount, which are transmitted from each of the plurality of power generators.

According to the power generator management system of arrangement 8, it is possible to calculate the power margin level on the information processing apparatus side and provide the calculated margin level of power supply in the plurality of power generators.

Arrangement 9. In the power generator management system (100) according to the above embodiment, the setting unit (112) sets the priority order to supply fuel to each of the plurality of power generators based on the power margin level.

According to the power generator management system of arrangement 9, it is possible to set the priority order to supply fuel to each of the plurality of power generators based on the power margin level.

Arrangement 10. In the power generator management system (100) according to the above embodiment, the setting unit (112) acquires information representing the remaining fuel amount at every predetermined timing from each of the plurality of power generators, and calculates a fuel consumption rate in each power generator based on a time-rate change of the information representing the remaining fuel amount.

According to the power generator management system of arrangement 10, it is possible to obtain the fuel consumption rate in each power generator based on the time-rate change of the information representing the remaining fuel amount acquired at every predetermined timing and set the priority order of fuel supply based on the fuel consumption rate.

Arrangement 11. In the power generator management system (100) according to the above embodiment, the setting unit (112) sets the priority order based on the fuel consumption rate.

According to the power generator management system of arrangement 11, it is possible to obtain the fuel consumption rate in each power generator based on the time-rate change of the information representing the remaining fuel amount and set the priority order of fuel supply based on the balance between the fuel consumption rate (demand) and supply.

Arrangement 12. In the power generator management system (100) according to the above embodiment, the information processing unit (SV)

specifies, based on the position information, a base where each power generator is arranged, and collects, via the network, fuel information from a vehicle located within a predetermined range with respect to the base as a center.

According to the power generator management system of arrangement 12, it is possible to collect fuel information from the vehicle located within the predetermined range with respect to the base as the center such that the fuel in the vehicle can be used by the power generator.

Arrangement 13. In the power generator management system (100) according to the above embodiment, the information processing unit (111) outputs, via the network (NET), a control signal to the vehicle such that the vehicle moves to the base.

According to the power generator management system of arrangement 13, it is possible to output a control signal to the vehicle such that the vehicle moves to the base located near the vehicle, and the fuel in the vehicle can be used by the power generator. This makes it possible to gather peripheral vehicles to the base located near the vehicles and use the fuel in the vehicles by the power generator.

Arrangement 14. In the power generator management system (100) according to the above embodiment, the control unit (for example, 216 in FIG. 3) of the power generator specifies, based on the position information, a base where the power generator is arranged, and collects, via the network, fuel information from a vehicle located within a predetermined range with respect to the base as a center.

According to the power generator management system of arrangement 14, it is possible to collect fuel information from the vehicle located within the predetermined range with respect to the base as the center such that the fuel in the vehicle can be used by the power generator.

Arrangement 15. In the power generator management system (100) according to the above embodiment, the information processing unit (111)

provides, based on the information transmitted from the plurality of power generators, information that combines the position information of the power generator in the operating state and the power margin level to an external information terminal device (TM1, TM2) via the network.

According to the power generator management system of arrangement 15, it is possible to provide the information that combines the position information of the power generator in the operating state and the power margin level to the external information terminal device of a person needing refuge. Accordingly, the person needing refuge who views the information terminal device TM1 or TM2 can determine the power margin level of each base (shelter), for example, which base (shelter) can supply sufficient power or is short in power.

Arrangement 16. In the power generator management system (100) according to the above embodiment, the information processing unit (111)

provides information that combines information arranged in descending order of the power margin level and information of a base where the power generator corresponding to the power margin level is arranged, and causes a display unit of the information terminal device to display the information.

According to the power generator management system of arrangement 16, it is possible to provide, to the information terminal device of a person needing refuge, the information that combines information arranged in the descending order of the power margin level and the information of the base where the power generator corresponding to the power margin level is arranged. Accordingly, the person needing refuge who views the information terminal device TM1 or TM2 can determine the power margin level of each base (shelter), for example, which base (shelter) can supply sufficient power or is short in power.

Arrangement 17. In the power generator management system (100) according to the above embodiment, the information processing unit (111)

provides position information of a base of the highest power margin level in a plurality of bases and route information for guidance to the base, and causes the display unit of the information terminal device to display the information.

Arrangement 18. In the power generator management system (100) according to the above embodiment, the information processing unit (111)
determines, based on the information representing the operating state, whether a power generator in a stop state exists among the plurality of power generators, and
assigns the power generator in the stop state as a power generator in a base of the lowest power margin level in the plurality of bases.

According to the power generator management system of arrangement 18, when the power generator in the stop state is assigned to the base of the lowest power margin level, leveling of the power margin levels of the bases (shelters) can be performed.

The invention is not limited to the foregoing embodiments, and various variations/changes are possible within the spirit of the invention.

What is claimed is:

1. A power generator management system comprising a plurality of power generators, and an information processing apparatus configured to process information acquired from the plurality of power generators,
    wherein each of the plurality of power generators comprises:
    a detection unit configured to detect a remaining fuel amount in a fuel tank of the power generator;
    a position acquisition unit configured to acquire position information of the power generator;
    a state acquisition unit configured to acquire information representing an operating state of the power generator; and
    a communication unit configured to transmit the remaining fuel amount, the position information, and information representing the operating state to the information processing apparatus via a network, and
    the information processing apparatus comprises an information processing unit configured to acquire a margin level of power supply in each of the plurality of power generators based on the information transmitted from the plurality of power generators and provide a result of the acquisition.

2. The power generator management system according to claim 1, wherein the power generator further comprises
    a remaining amount acquisition unit configured to acquire a remaining fuel amount in a reserve tank, and
    the communication unit transmits information representing the remaining fuel amount in the fuel tank and information representing the remaining fuel amount in the reserve tank to the information processing apparatus.

3. The power generator management system according to claim 2, wherein the remaining amount acquisition unit acquires the information representing the remaining fuel amount in the reserve tank based on information input from an input unit.

4. The power generator management system according to claim 1, wherein the information processing apparatus further comprises a setting unit configured to set a priority order to supply fuel to each of the plurality of power generators, and
    the setting unit sets the priority order based on the position information and information representing the remaining fuel amount.

5. The power generator management system according to claim 4, wherein the information processing unit acquires installation position information of a facility capable of providing fuel to the power generator, and
    the setting unit sets the priority order based on comparison between the installation position information and the position information of each of the plurality of power generators.

6. The power generator management system according to claim 5, wherein the setting unit sets the priority order in accordance with a distance from each power generator to the facility.

7. The power generator management system according to claim 4, wherein the power generator further comprises a control unit configured to control the power generator,
    wherein the control unit calculates a power margin level representing a degree of margin of power supply based on information representing a power generation capability of the power generator and the information representing the remaining fuel amount, and
    the communication unit transmits the power margin level to the information processing apparatus.

8. The power generator management system according to claim 4, wherein the information processing unit acquires a power margin level representing a degree of margin of power supply in each power generator based on information representing a power generation capability of the power generator and the information representing the remaining fuel amount, which are transmitted from each of the plurality of power generators.

9. The power generator management system according to claim 7, wherein the setting unit sets the priority order to supply fuel to each of the plurality of power generators based on the power margin level.

10. The power generator management system according to claim 4, wherein the setting unit acquires information representing the remaining fuel amount at every predetermined timing from each of the plurality of power generators, and calculates a fuel consumption rate in each power generator based on a time-rate change of the information representing the remaining fuel amount.

11. The power generator management system according to claim 10, wherein the setting unit sets the priority order based on the fuel consumption rate.

12. The power generator management system according to claim 1, wherein the information processing unit
    specifies, based on the position information, a base where each power generator is arranged, and
    collects, via the network, fuel information from a vehicle located within a predetermined range with respect to the base as a center.

13. The power generator management system according to claim 12, wherein the information processing unit outputs, via the network, a control signal to the vehicle such that the vehicle moves to the base.

14. The power generator management system according to claim 7, wherein the control unit of the power generator
    specifies, based on the position information, a base where the power generator is arranged, and
    collects, via the network, fuel information from a vehicle located within a predetermined range with respect to the base as a center.

15. The power generator management system according to claim 7, wherein the information processing unit provides, based on the information transmitted from the plurality of power generators, information that combines the position information of the power generator in the operating state and the power margin level to an external information terminal device via the network.

16. The power generator management system according to claim 15, wherein the information processing unit provides information that combines information arranged in descending order of the power margin level and information of a base where the power generator corresponding to the power margin level is arranged, and causes a display unit of the information terminal device to display the information.

17. The power generator management system according to claim 15, wherein the information processing unit provides position information of a base of the highest power margin level in a plurality of bases and route information for guidance to the base, and causes the display unit of the information terminal device to display the information.

18. The power generator management system according to claim 15, wherein the information processing unit
- determines, based on the information representing the operating state, whether a power generator in a stop state exists among the plurality of power generators, and
- assigns the power generator in the stop state as a power generator in a base of the lowest power margin level in the plurality of bases.

* * * * *